United States Patent [19]

Meyer et al.

[11] Patent Number: 5,871,713
[45] Date of Patent: Feb. 16, 1999

[54] MACROMOLECULAR POLYAMINE IODINE-CONTAINING COMPOUND, PROCESS FOR ITS PREPARATION AND ITS USE AS A CONTRAST AGENT

[75] Inventors: Dominique Meyer, Saint-Maur; Soizic Le Greneur, Bures-sur-Yvette, both of France

[73] Assignee: Guerbet S.A., Villepinte, France

[21] Appl. No.: 698,751

[22] Filed: Aug. 16, 1996

Related U.S. Application Data

[63] Continuation of Ser. No. 244,623, filed as PCT/FR92/01135 Dec. 3, 1992, abandoned.

[30] Foreign Application Priority Data

Dec. 4, 1991 [FR] France ................................. 91 15037
Mar. 13, 1992 [FR] France ................................. 92 03063

[51] Int. Cl.⁶ ...................... A61K 49/04; C07C 233/05
[52] U.S. Cl. ..................... 424/9.452; 424/9.451; 514/535; 514/563; 514/616; 525/911; 526/307; 528/363; 528/369; 560/37; 560/38; 560/43; 562/433; 562/455; 564/153
[58] Field of Search ............... 424/9.452, 9.451, 424/78.35; 564/153; 525/911; 526/307; 528/363, 369; 562/433, 455; 560/37, 38, 43; 514/616, 535, 563

[56] References Cited

U.S. PATENT DOCUMENTS

| | | | |
|---|---|---|---|
| 4,289,872 | 9/1981 | Denkewalter et al. | 528/328 |
| 4,406,878 | 9/1983 | Deboer | 424/5 |
| 4,507,466 | 3/1985 | Tomalia et al. | 528/332 |
| 4,558,120 | 12/1985 | Tomalia et al. | 528/363 |
| 4,568,737 | 2/1986 | Tomalia et al. | 528/323 |
| 4,587,329 | 5/1986 | Tomalia et al. | 528/363 |
| 4,599,400 | 7/1986 | Tomalia et al. | 528/405 |
| 4,631,337 | 12/1986 | Tomalia et al. | 528/391 |
| 4,690,985 | 9/1987 | Tomalia et al. | 525/419 |
| 4,694,064 | 9/1987 | Tomalia et al. | 528/332 |
| 4,713,975 | 12/1987 | Tomalia et al. | 73/865.8 |
| 4,737,550 | 4/1988 | Tomalia | 525/418 |
| 4,857,599 | 8/1989 | Tomalia et al. | 525/259 |
| 4,871,779 | 10/1989 | Killat et al. | 521/28 |

FOREIGN PATENT DOCUMENTS

| | | |
|---|---|---|
| 0 203 833 | 3/1986 | European Pat. Off. . |
| 0 374 266 | 6/1989 | European Pat. Off. . |
| 0 354 836 | 8/1989 | European Pat. Off. . |
| 0 436 316 | 12/1990 | European Pat. Off. . |
| 2610935 | 8/1988 | France . |
| 52 906 | 1/1967 | Luxembourg . |
| WO 88/06162 | 2/1987 | WIPO . |
| WO 88/01178 | 8/1987 | WIPO . |
| WO 88/01179 | 8/1987 | WIPO . |
| WO 90/01500 | 3/1989 | WIPO . |

OTHER PUBLICATIONS

Die Markromol. Chem., Rapid Commun. vol.6, pp.503–507 (1985).

*Primary Examiner*—Shailendra Kumar
*Attorney, Agent, or Firm*—Jacobson, Price, Holman & Stern, PLLC

[57] ABSTRACT

Biological or synthetic macromolecular polyamine compound. optionally of the dendrimer type, characterized in that it carries at least three radio-opaque iodine-containing derivatives.

10 Claims, No Drawings

MACROMOLECULAR POLYAMINE IODINE-CONTAINING COMPOUND, PROCESS FOR ITS PREPARATION AND ITS USE AS A CONTRAST AGENT

This application is a continuation of application Ser. No. 08/244,623, filed Aug. 3, 1994, now abandoned, which is a 371 of PCT/FR92/01135 filed Dec. 3, 1992.

The invention relates to a novel macromolecular polyamine iodine-containing compound.

It also relates to the process for the preparation of the abovesaid compound and to its use as contrast agent, especially in X-ray imaging.

It finally relates to compositions which are based on the abovesaid compound and which can be administered for sake of a diagnosis.

Macromolecular iodine-containing compounds adapted to be used as contrast agents are already known for instance by the patents FR-A-87 01876 and FR-A-88 10794.

These compounds, taken as a whole, are satisfying from the point of view of the properties which are well-known by those skilled in the art and which are necessary to enable their use as contrast agents, namely:
— a stability in water sufficiently high to resist to sterilization conditions,
— a high molar concentration in iodine,
— a low osmolality,
— a low toxicity,
— a solubility in water which is sufficient at physiologically acceptable pH values.

However, their preparation involves stringent conditions which have repercussions on their price.

Taking this fact into consideration, the Applicant Company has contemplated the object to put at the disposal of the medical circles macromolecular compounds which satisfy at least as well as those already known the requirements of the practice as far as the abovesaid properties are concerned, while being of an easier preparation, enriching thus the panoply of contrast agents available to the user.

The Applicant Company has had the merit of achieving that object by way of the preparation of a macromolecular polyamine compound of biological or synthetical origin which is characterized by the fact that it comprises at least three iodine-containing radio-opaque derivatives.

According to a preferred embodiment of the invention, the macromolecular polyamine compound is a polymer of the dendrimer-type.

Hereafter the word "dendrimers" denotes polymers comprising ramifications, i.e. which are branched, and on which functional groups uniformly distributed at the periphery of the said ramifications are present.

One of the principal advantages of this particular polymer type is that it is possible to control precisely their dimensions and their form in view of their final use.

Sometimes, these molecular weight polymers are denoted by the expression mono-dispersed polymers in oppposition to poly-dispersed polymers whose molecular weight represents in fact the average of the different molecular weights which are present within the product.

For convenience of the language, the expression "dendrimers" is used hereafter to denote the polyamine polymers also identified by the expression dense star polymers, the dense star polyamines, the Starburst polymers, the polymers in cascade, the star combed-branched polyamines, the bridged dense star polymers, the arborols and the branched polylysines.

With respect to the characteristic features of the dendrimers and arborols as well as for their preparation, it is possible to refer to the patent applications and/or the patents hereafter quoted, i.e. EP 271 180, U.S. Pat. No. 4,507,466, U.S. Pat. No. 4,694,064, U.S. Pat. No. 4,713,975, U.S. Pat. No. 4,857,599, U.S. Pat. No. 4,690,985, U.S. Pat. No. 4,599,400, U.S. Pat. No. 4,871,779, U.S. Pat. No. 4,737,550, U.S. Pat. No. 4,587,329, U.S. Pat. No. 4,568,737, U.S. Pat. No. 4,558,120, U.S. Pat. No. 4,631,337, as well as to the publication "Angewandte Chemie Int." Ed. Engl. 29 (1990), 138–175, which are incorporated by reference. The branched polylysines are especially disclosed in the U.S. Pat. No. 4,289,872 and in the publication "Proc. Natl. Acad. Sci." USA, 85, 5409–5413, 1988.

More especially, the macromolecular polyamine iodine-containing compound according to the invention is characterized by the fact that it presents the general formula:

$$P \mathord{+} NK_x\mathord{-}A\mathord{-}G]_n \qquad (I)$$

wherein
— P represents the radical of a macromolecular polyamine compound or support of biological or synthetical origin,
— K represents a hydrogen atom or a lower linear or branched alkyl group, a lower linear or branched hydroxy- or polyhydroxy-alkyl group, a lower linear or branched alkoxyalkyl group, a lower linear or branched alkoxyhydroxy- or alkoxypolyhydroxyalkyl group, as well as a group —A—G,
— x is an integer equal to 0 or 1,
— G is an iodine-containing radio-opaque derivative especially consisting of a benzenic derivative of the formula:

(II)

wherein the constituents $R_1$, $R_2$, $R_3$, $R_4$ and $R_5$, which are identical or different from one another, represent:
— iodine,
— hydrogen,
— COOH,
— $COO^-M^{y+}$, M representing a physiological acceptable cation and y an integer from 1 to 3,

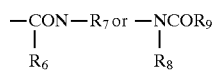

which are identical or different from one another, represent hydrogen or a lower linear or branched alkyl group, a lower linear or branched hydroxyalkyl group, a lower linear or branched polyhydroxyalkyl group, a lower linear or branched alkoxyalkyl group, a lower linear or branched alkoxyhydroxyalkyl group, a lower linear or branched alkoxypolyhydroxyalkyl group,
the substituents $R_2$, $R_3$ and $R_4$ representing possibly also a group

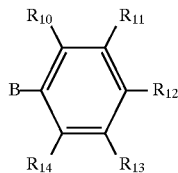

wherein
- the substituents $R_{10}$, $R_{11}$, $R_{12}$, $R_{13}$ and $R_{14}$, which are identical or different from one another, have the same signification as $R_1$, $R_2$, $R_3$, $R_4$ and $R_5$, and
- B represents a single bond or a group —$R_{15}$—D—$R_{16}$— wherein $R_{15}$ and $R_{16}$, which are identical or different, represent the groups:

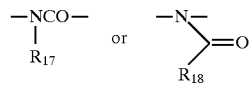

wherein
- $R_{17}$ and $R_{18}$ have the same significations as $R_6$ and
- D represents a single bond or has the same significations as $R_6$ except hydrogen,
- A represents a bonding group adapted to permit the grafting of a iodine-containing radio-opaque derivative, especially of the derivative of formula (II), on the amine groups of the said macromolecular compound, and
- n represents an integer varying from about 3 to about 500, preferably from about 10 to about 300 and, still more preferably, from about 30 to about 200, with the proviso that at least one of the substituents $R_1$, $R_2$, $R_3$, $R_4$, $R_5$, $R_{10}$, $R_{11}$, $R_{12}$, $R_{13}$ and $R_{14}$ represents an iodine atom.

The substituents $R_6$, $R_7$, $R_8$, $R_9$, $R_{17}$ and $R_{18}$ are preferably consisting of a hydrogen atom or of the following radicals:

$-CH_3$, $-CH_2CH_3$, $-CH_2CH_2OH$, $-CH_2CHOHCH_2OH$,

, $-CHOHCH_3$, $-CH_2CHOHCHOHCH_2OH$,

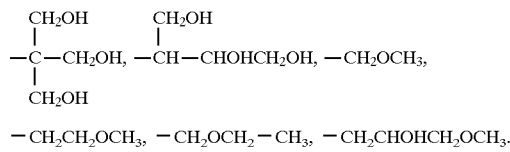

$-CH_2CH_2OCH_3$, $-CH_2OCH_2-CH_3$, $-CH_2CHOHCH_2OCH_3$.

D represents preferably one of the following radicals:

$-CH_2CH_2-$, $-CH_2-$, $-CH_2CH_2CH_2-$, $-CH_2CHOHCH_2-$, $-CH_2-(CHOH)_2-CH_2-$,

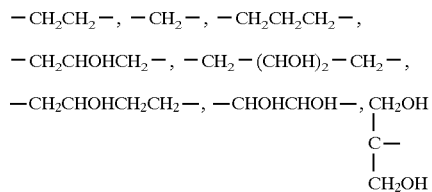

The macromolecular polyamine iodine-containing compound according to the invention is called saturated when each of the amine groups initially present carries an iodine-containing derivative G and it is called unsaturated when after fixation of the derivative G there remain free amine groups.

According to an advantageous embodiment of the macromolecular polyamine iodine-containing compound according to the invention, the macromolecular polyamine support P is selected from the group comprising the polyalkylamines, especially the polyethylenimines, the polypeptides, especially polylysine, polyornithine, polyarginine, polyasparagine, polyglutamine, the proteins, especially albumine, the polyallylamines of general formula $[-CH_2CH(CH_2NH_2 \cdot HCl)-]_n$, the poly[N(2-aminoethyl)] methacrylamides, the polyaminocarbohydrates such as poly (amino-dextran) and chitosan.

Among the dendrimers which can be used in connection with the invention and according to the denoting used in the patents and publications hereabove referred to, it is possible to cite in a non-limiting way:

the polyethylenimine dendrimers (PEI) of the 1st, 2nd, 3rd, 4th generation of formula ① and ② or the polyamidoamines (PAMAM) of the 1st, 2nd, 3rd, 4th or 5th generation of formula ③, ④ and ⑤

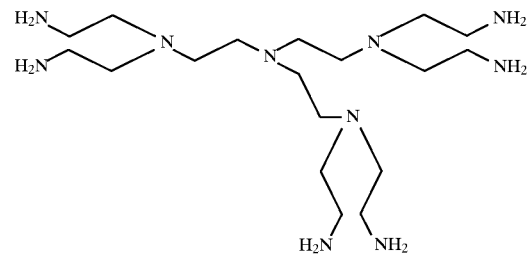

①

-continued
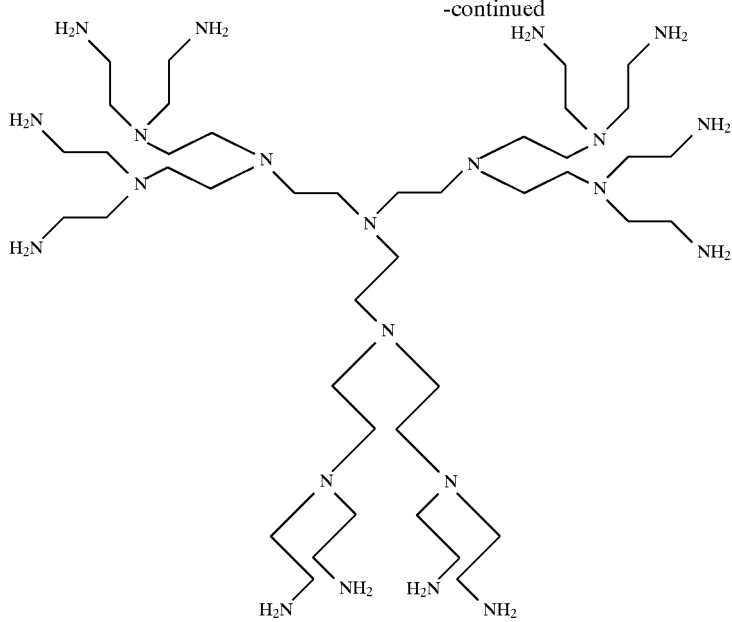
(2)
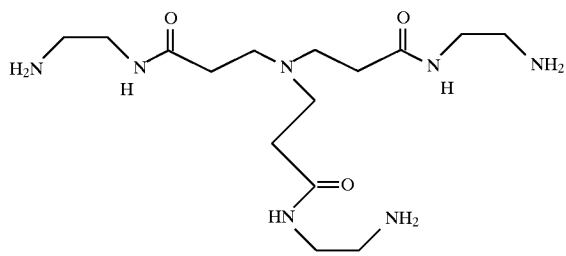
(3)
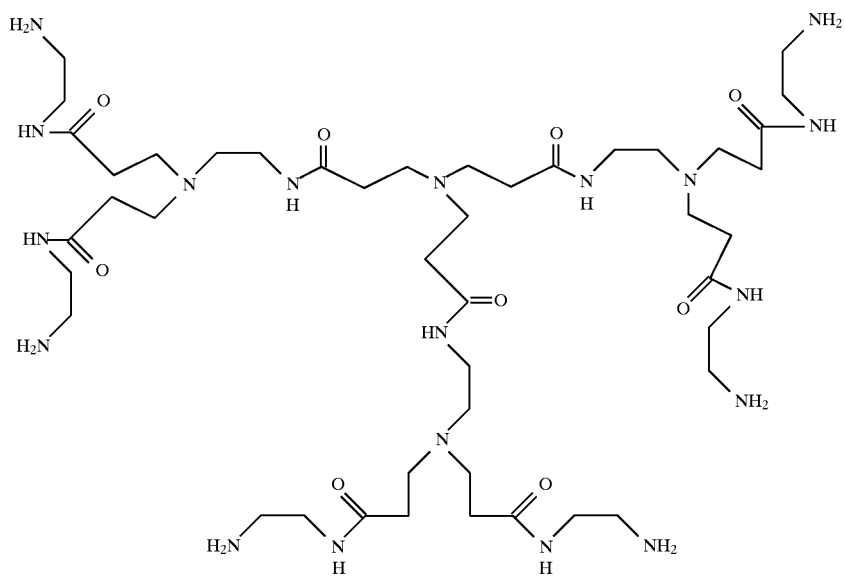
(4)
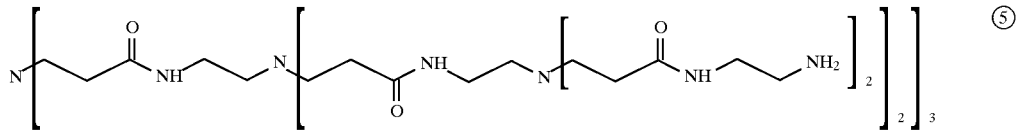
(5)
The selection of the number of repetitions of the structural unit and by way of consequence the number of —NH$_2$ groups present at the periphery of the dendrimer which determines the number of polyiodinated radio-opaque derivatives adapted to be grafted on the dendrimer is carried out as a function especially of the diagnosis use of the product.

In the same way and as disclosed in the above-referred patents and publications, the structural unit is generally selected among:

$$-\overset{|}{\underset{|}{N}}-, \quad \diagdown N \diagup \diagdown N \diagup, \quad \diagdown N \diagup \diagdown \overset{|}{N} \diagup \diagdown N \diagup$$

It is possible to select other structural units adapted to the preparation of dendrimers.

According to another advantageous embodiment of the macromolecular polyamine iodine-containing compound according to the invention, the bonding group A is selected among the radicals of the group comprising:

$$-\underset{O}{\overset{\parallel}{C}}-, \quad -\underset{O}{\overset{\parallel}{C}}-R_{19}-, \quad -R_{19}-\underset{COR_{20}}{\overset{|}{N}}-, \quad -COR_{21}\underset{R_{20}}{\overset{|}{C}ON}-,$$

$$-R_{19}-\underset{R_{20}}{\overset{|}{N}CO}-, \quad -R_{19}-\underset{R_{20}}{\overset{|}{C}ON}-$$

wherein
— $R_{19}$ represents a lower linear or branched alkyl group, a lower linear or branched hydroxyalkyl group, a lower linear or branched polyhydroxyalkyl group, a lower linear or branched alkoxyalkyl group, a lower linear or branched alkoxyhydroxyalkyl group or a lower linear or branched alkoxypolyhydroxyalkyl group and
— $R_{20}$ has the same significations as $R_6$ and
— $R_{21}$ represents a single bond or has the same significations as $R_{19}$.

The substituent $R_{20}$ may have the same preferred significations as those indicated hereabove with respect to $R_6$, $R_7$, $R_8$, $R_9$, $R_{17}$ and $R_{18}$.

The substituents $R_{19}$ and $R_{21}$ preferably consist of the following radicals:

$$-CH_2-, \quad -CH_2CH_2-, \quad CH_2CH_2CH_2-,$$
$$-O-CH_2CH_2CH_2-, \quad -OCH_2-, \quad -OCH_2CH_2-,$$
$$-CH_2-\underset{CH_2-CH_3}{\overset{|}{C}H}-, \quad -CH_2-\underset{CH_3}{\overset{|}{C}H}-, \quad -CH_2CHOHCH_2-.$$

The expression lower alkyl group or lower alkoxyalkyl group denotes groups in $C_1$ to $C_6$; the expression polyhydroxyalkyl group or polyhydroxyalkcoxyalkyl group denotes groups carrying from 2 to 5 hydroxyl groups.

According to another advantageous embodiment of the macromolecular polyamine iodine-containing compound according to the invention, the iodine-containing radio-opaque derivative G is a benzenic derivative of the formula:

(III)

wherein $R_2$ and $R_4$ have the significations hereabove indicated.

According to another embodiment of the macromolecular polyamine iodine-containing compound according to the invention, the iodine-containing radio-opaque derivative is a benzenic derivative selected from the group comprising those which correspond to the formulae:

(IV)

(V)

wherein $R_6$, $R_7$, $R_8$ and $R_9$ present the significations hereabove indicated.

The process according to the invention for the preparation of the macromolecular polyamine iodine-containing compound according to the invention is characterized by the fact that
—a macromolecular polyamine support P is selected and that at least three of its amine groups are subjected
—either to an acylation reaction, within a solvent of the group comprising DMAC, DMF and FMSO, possibly in the presence of a mineral or organic base of the group comprising NaOH, triethylamine, sodium carbonate, with a compound of the formula:

$$Z_1-A-G \quad (VI)$$

wherin G is such as hereabove defined and $Z_1$—A is selected from among:

$$Z_1-\underset{O}{\overset{\parallel}{C}}-, \quad Z_1-\underset{O}{\overset{\parallel}{C}}-R_{19}, \quad Z_1-\underset{O}{\overset{\parallel}{C}}-R_{21}\underset{R_{20}}{\overset{|}{C}ON}-$$

wherein $R_{19}$, $R_{20}$, $R_{21}$ are such as hereabove defined and $Z_1$ represents a chlorine or bromine atom, the hydroxyl groups which are possibly present being previously protected,
—or to an alkylation reaction, within a solvent of the group comprising DMAC, DMF and DMSO, possibly in the presence of a mineral or organic base of the group comprising NaOH, triethylamine, sodium carbonate, with a compound of formula:

$$Z_2-A-G \quad (VII)$$

wherein G is such as hereabove defined and $Z_2$—A is selected from among:

$$Z_2-R_{19}-\underset{O}{\overset{\parallel}{C}}-, \quad Z_2-R_{19}-\underset{COR_{20}}{\overset{|}{N}}-,$$

$$Z_2-R_{19}-\underset{R_{20}}{\overset{|}{N}}-\underset{O}{\overset{\parallel}{C}}-, \quad Z_2-R_{19}-\underset{R_{20}}{\overset{|}{C}ON}-$$

wherein $R_{19}$, $R_{20}$ are such as previously defined and $Z_2$ represents a chlorine, bromine, or iodine atom, a OMs (O-mesyl), OTs (O-tosyl) group, or an epoxyde, the hydroxyl groups which are possibly present being previously protected, at least a part of the residual amine groups of the macromolecular support being possibly subjected after deprotection of the hydroxyl groups which are possibly present, within a solvent of the group comprising DMAC, DMF and DMSO, possibly in the presence of a mineral or organic base of the group comprising NaOH, triethylamine, sodium carbonate, to an alkylation reaction with a compound of the formula:

L—Y  (VIII)

wherein Y has the same significations as $Z_2$ or represents an activated —CO group under the form of an acid halogenide, an anhydride or an ester and L represents a lower linear or branched alkyl group, a lower linear or branched hydroxy- or polyhydroxyalkyl group, a lower linear or branched alkoxyalkyl group, a lower linear or branched alkoxyhydroxy- or alkoxypolyhydroxyalkyl group, the hydroxyl groups of which have been protected, it being possible to deprotect then the protected hydroxyl groups of L.

According to an advantageous embodiment of the abovesaid process, the radio-opaque derivative G is selected from among the benzenic derivatives of formula (II) and at least three of the amine groups of the macromolecular amine support of formula P are subjected —either to an acylation reaction with a compound of the formula:

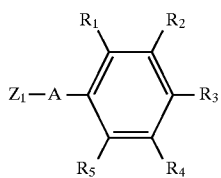

(VI')

—or to an alkylation reaction with a compound of the formula:

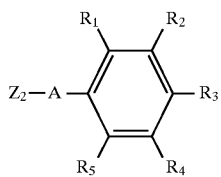

(VII')

in order to obtain the compound of formula (IX) hereafter indicated:

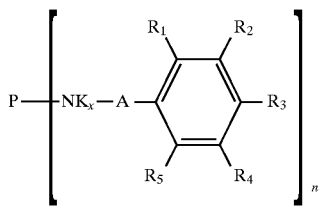

(IX)

of which at least one part of the residual amine groups can be subjected to the alkylation reaction with a compound L—Y, with the proviso that P, x, n, K, $R_1$ to $R_5$, $Z_1$—A—, $Z_2$—A—, L and Y present the hereabove indicated significations.

The process according to the invention is especially advantageous due to the fact that it is not necessary to activate the macromolecular support before its reaction with the radio-opaque iodine-containing derivative.

It is possible to obtain the polyamine polyiodinated derivatives according to the invention also by the Michael addition of the —$NH_2$ groups of the dendrimer on an iodine-containing acrylamide prepared according to the process disclosed in the document EP 436 316.

It is indicated, with respect to the macromolecular polyamine support P, that the amine-containing polyacids and the polyalkylamines are marketed by the Company Sigma Chemical Co. (Strasbourg, France), that the polyallylamines and the polyalkylamines are marketed by the Company Aldrich Chemical Company (Milwaukee, Wisc.) and by the Company Polysciences Inc. (Warrington, Pa.), that the synthesis of the poly[N-(2-aminoéthyl)] methacrylamides is disclosed in the application WO 9012050, that polyaminodextran and its preparation are disclosed in U.S. Pat. No. 4,699,784 and that chitosan is marketed by the Company Sigma Chemical Co.

The molecular weights of the macromolecular supports contemplated within the frame of the invention are from about 5,000 to about 200,000, preferably from about 5,000 to about 100,000.

As far as the radio-opaque iodine-containing derivatives G of formula (II) are concerned, those hereafter identified are advantageously used under the form of their acid chloride or their acid, these derivatives being hereafter arranged in groups with respect to the number of iodine atoms of the molecule.

So,
—among the compounds containing one iodine atom, it is possible to indicate those corresponding to formulae:

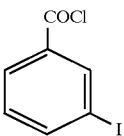

disclosed in zh. Org. Khim. 19 (11), 2368–73 (1983) and

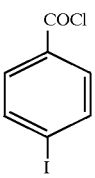

disclosed in Org. Synth. 61, 8–13 (1983),

—among the compounds containing two iodine atoms, it is possible to indicate the one of formula:

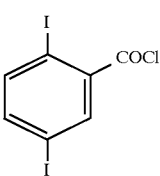

disclosed in Chemical Abstracts 68 (10): 40524j,

—among the derivatives containing three iodine atoms, it is possible to use those already known as contrast agents, i.e.:

—the one known under the name diatrizoate and disclosed in the norwegian patent No. 59-134075, —the one known under the name ioxithalamate and disclosed in DE-OS 16 43 440, —the one known under the name metrizoate and disclosed in the publication "Farmakoterapi" 18:1–29 (1962), — the one known under the name iothalamate and disclosed in the publication "J. Med. Chem." 6:24–26 (1963),
— those corresponding to formulae:

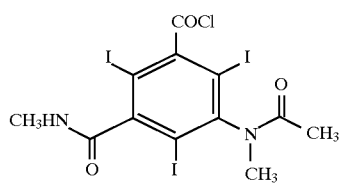
(BSM 6777 M)

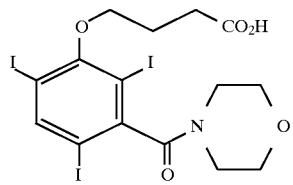

disclosed in Chemical Abstracts 72: 43699p (1970),

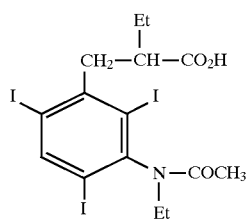

disclosed in Chemical Abstracts 72: 100292b (1970),

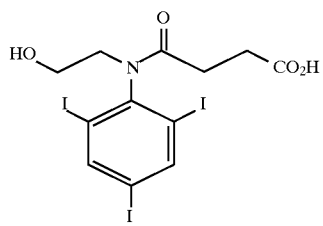

disclosed in Chemical Abstracts 72: 66587q (1970),

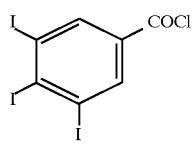

disclosed in Chemical Abstracts 80 (23): 133786j,
— among the derivatives containing four iodine atoms, it is possible to indicate the one of formula:

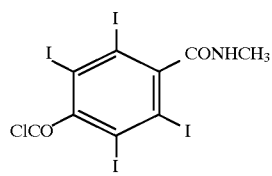

disclosed in Chemical Abstracts 76 (5): 24873g,
— among the derivatives containing five iodine atoms, it is possible to indicate the one of formula:

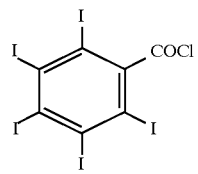

disclosed in Chemical Abstracts 87 (25): 200955y,
— among the derivatives containing six iodine atoms, it is possible to indicate those disclosed in the French patent FR 2 272 640 and corresponding namely to the following formulae:

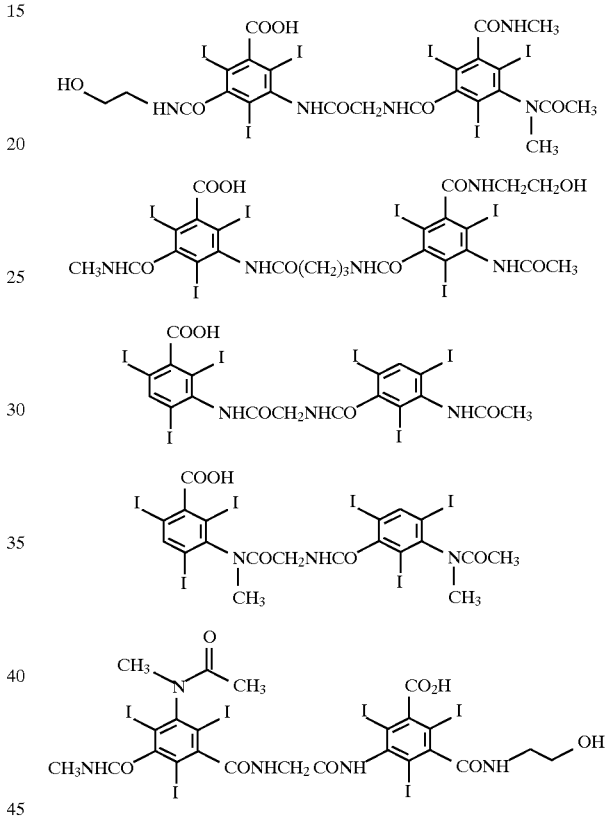

According to the invention, not only iodine-containing derivatives under the form of a racemic mixture are used but also stereoisomers such as the enantiomers, the diastereoisomers, the atropoisomers, the isomers SYN-ANTI, ENDO-EXO, E-Z, selected as a function of the presence of asymetric carbon atoms and/or to the rotation hindrance due to the steric hindrance provided by the iodine atoms and/or by the substituents $R_1$ to $R_{21}$.

It is indicated that, in the case of the iodine-containing derivatives which are available under the form of carboxylic acids, the transformation into the acid chloride according to the representation:

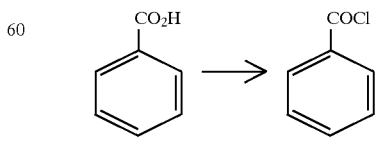

occurs by way of a transformation into the chloride in the presence of $SOCl_2$ or Cl—CO—CO—Cl, in a conventional manner, the hydroxyl groups if any of the iodine-containing derivative having been previously protected, for example under the form of acetates or cyclic acetals, by way of a manner in itself known.

The transformation into an iodine-containing derivative under the form of the acid chloride permits then the preparation of the polymers according to the invention by use of the process according to the invention.

Among the compounds of formula L-Y which are put into reaction with the amine groups of the macromolecular support which have not reacted with the iodine-containing derivative, it is possible to indicate those adapted to provide the hydrophile groups to the iodine-containing polymer according to the invention such as chloropropanediol, glycidol and chloroethanol. The principal interest of that alkylation of the macromolecular support is that it improves the solubility of the final compound.

With respect to the concepts of saturation and of insaturation hereabove mentioned, it is indicated that the invention encompasses not only the iodine-containing polyamine polymers of the type:

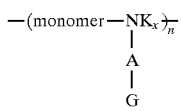

but also those of formula:

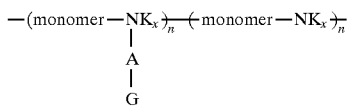

Furthermore, with respect to the modification according to which the amine groups of the polymer which remain after fixation of the iodine-containing derivative are alkylated with a compound L-Y, the two following types of products are also possible:

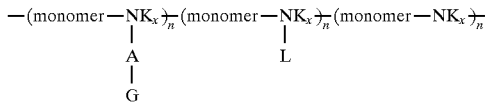

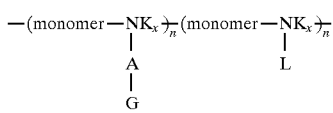

The invention encompasses also the polymers wherein the amine group is located linearity inside the chain constituting the monomer:

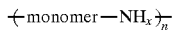

and also the polymers wherein the amine group is located in a branched way within the monomer:

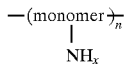

The invention may still be better comprised by way of the non-limiting examples which follow and which are given with respect to advantageous embodiments.

EXAMPLE 1

Preparation of the Iodine-Containing Polymer of Formula

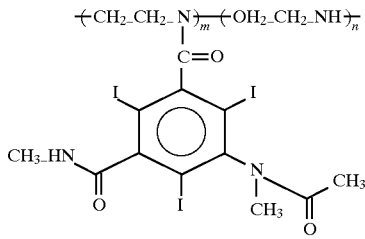

Synthesis no. 1

20 g of polyethylenimine having an average molecular weight of 50,000 (Sigma Chemical Co.) are introduced by way of a 50% aqueous solution (0.232 m) into 50 ml of DMAC.

50 g of 2,4,6-triiodo-3-N-methyl carbamoyl-5-N-acetyl-N-methylaminobenzoic acid chloride (0.077 m) obtained by way of the process disclosed in the French patent No. 2,272,640 are added by way of small portions.

The reaction medium, which is maintained at the ambient temperature, is stirred during 24 hours and then poured into 2 liters of methanol.

The precipitate obtained is filtrated, washed with ether and dried under vacuum.

After having washed it with NaOH 1N, 43 g of the product are obtained with a yield of 86%.

Percentage in iodine: 51% (weight/weight).

Synthesis no. 2

20 g of polyethylenimine having an average molecular weight of 50,000 (Sigma Chemical Co.) are introduced as a 50% aqueous solution (0.232 m) into 50 ml of DMAC.

20 g of the acid chloride used in synthesis no. 1 (0.031 m) are introduced at the ambient temperature by way of small portions.

The reaction medium is stirred during 24 hours and then poured into 2 liters of ether. The precipitate thus obtained is filtrated and dried under vacuum.

29 g of the product are obtained, the yield being 90%.

Percentage in iodine: 41% (weight/weight).

EXAMPLE 2

Preparation of the Iodine-Containing Polymer of Formula

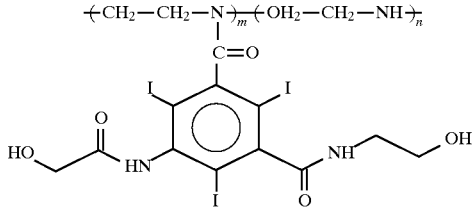

20 g of polyethylenimine having an average molecular weight of 50,000 (Sigma Chemical Co.) are introduced as a 50% aqueous solution (0.232 m) into 50 ml of DMAC.

At ambient temperature, 26.5 g of 2,4,6-triiodo-3-N-(2-acetoxyethyl)-5-acetoxyacétamido-isophtalic acid chloride (0.0348 m) obtained according to the process disclosed in the patent application EP 0 426 610 are introduced by way of small portions.

The reaction medium is stirred during 2 hours and then poured into 2 liters of ethylic ether.

After saponification with NaOH, the iodine-containing polymer thus obtained is purified on the resin IRN 77 and IRA 68.

Percentage en iodine: 40.5% (weight/weight).

EXAMPLE 3

Preparation of the Iodine-Containing Polymer of Formula

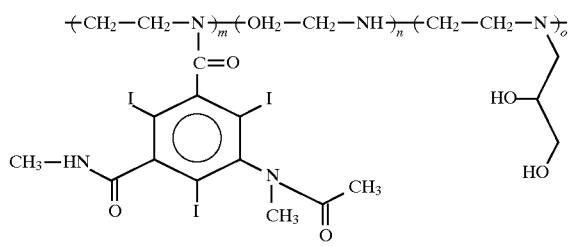

5 g of the iodine-containing polymer obtained in example 1 (synthesis no. 2) are dissolved in 50 ml of methanol.

2.5 ml of glycidol (Merck) are added dropwise at 45° C.

The reaction medium is heated to 60° C. during 6 hours.

The thus obtained methanol solution is poured into 500 ml of ethylic ether.

The thus obtained precipitate is washed in 200 ml of ethylic ether and dried under vacuum.

The contemplated product is obtained at a yield of 92%.

Percentage en iodine: 29.5% (weight/weight).

EXAMPLE 4

Preparation of a Polyiodine-Containing Dendrimer

A. Preparation of the polyamidoamine of the hereafter indicated formula (d).

First of all, a polyamidoamine is prepared according to steps 1 to 4.

Step 1: Preparation of the compound of formula

300 g (3.48 moles) of methyl acrylate (commercially available at ALDRICH—Strasbourg) are reacted inside 100 ml of a 8% ammonia solution in methanol, at ambient temperature and during 3.5 days, according to the method disclosed in the american patent U.S. Pat. No. 4,507,466.

240 g of product (a) under the form of a yellowish oil are obtained.

CCM Silicum petroleum ether/ethylic ether 50/50 rf: 0.6

RMN $^1$H (ppm, 200 mHz) : 3.58 singulets 9 H methyl groups; 2.68 triplets 6 H methylene; 2.40 triplets 6 H methylene.

Step 2: Preparation of the compound of formula

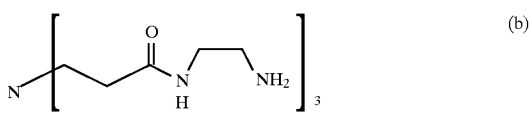

28.1 g (0.102 mol) of product (a) obtained at step 1 are reacted with 500 g (8.3 mols) of ethylenediamine in 270 ml of methanol during two days at ambient temperature, according to the method disclosed in the american patent U.S. Pat. No. 4,507,466.

36 g of product (b) under the form of a yellowish oil are obtained (Yield: 99%).

RMN $^1$H (ppm), 200 MHz) 1.5 singulet 6 H—NH$_2$; 2.2 triplets 6 H methylene; 2.6 multiplets 12 H ethylenediamine; 3.0 multiplets 6 H methylene; 8.0 triplets NH amide.

Step 3: Preparation of the compound of formula

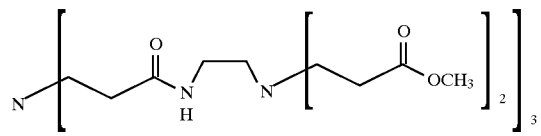

30 g (83.5 nmols) of product (b) obtained in step 2 dissolved in 125 ml of methanol are reacted with 143 g (1.67 mol) of methyl acrylate according to the method disclosed in the american patent U.S. Pat. No. 4,507,466.

The mixture is heated to 32° C. then stirred at ambient temperature during 21 hours.

65 g of product (c) are obtained, i.e. a yield of 75%. RMN$^{13}$ C (ppm, 50 mHz)

51 methyl; 171.1 CO amide; 172.4 CO ester.

Step 4: Preparation of the polyamidoamine of formula

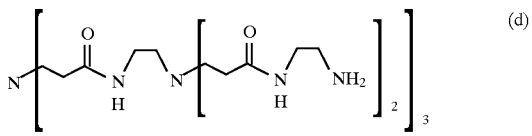

65 g (74.3 mmols) of product (c) obtained at step 3 in 100 ml of methanol are reacted with 622 g (10.3 mols) of ethylenediamine in 500 ml of methanol according to the method disclosed in the american patent U.S. Pat. No. 4,507,466.

After reaction during three days at ambient temperature and evaporation under reduced pressure, 76 g of product (d) (Yield: 98%) under the form of a yellowish oil are obtained.

RMN$^{13}$C (ppm, 50 mHz) 171.7 et 171.1 CO amide.

B. Preparation of the polyiodine-containing dendrimer 2 g (0.00192 mol) of product (d) obtained at step 4 are dissolved in 50 ml of methanol. 1.9 ml (0.0135 mol) of triethylamine are added to the reaction medium. 8.7 g (0.0135 mole) of 5-N-methylacetamido-2,4,6-triiodo-3N-methylaminocarbonylbutamide chloride prepared according to the method disclosed in the French patent FR 2 272 640 are added under the form of powder to the reaction medium. The stirring is maintained during 24 hours at ambient temperature. The methanolic solution is poured onto 500 ml of ethylic ether.

The thus obtained precipitate is filtrated and dried. The product is purified by chromatography on silicum plate. 9.5 g of raw product brut are obtained under the form of a white powder.

Percentage in iodine: 35% (weight/weight).

CCM (SiO$_2$) dichloromethane/methanol 50/50.

Rf: 0.46.

EXAMPLE 5

Preparation of the Iodine-Containing Polymer of Formula

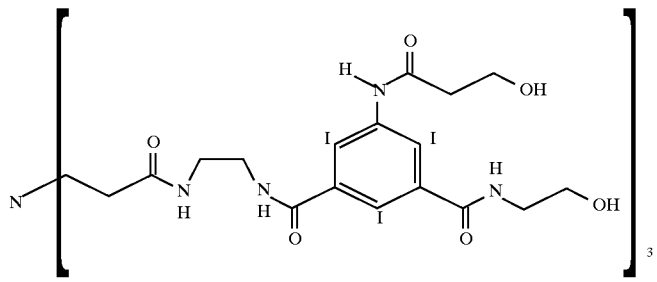

1.8 g (5 mmols) of the product obtained at example 4 step 2 are dissolved in 50 ml of N,N-dimethylacetamide. 2.8 ml (20 mmols) of triethylamine are added to the reaction medium.

12.2 g (16 mmols) of 2,4,6-triiodo-3-N-(2-acetoxyethyl)-5-acetoxyacetamido-isophthalic acid chloride obtained according to the process disclosed in the european patent application EP 426 610 are added dropwise under the form of powder to the reaction medium. The stirring is maintained during twelve hours at ambient temperature. The triethylamine salts are eliminated by filtration and the solution is poured onto 400 ml of ethylic ether.

The thus obtained precipitate is added to 300 ml of methanol and saponified with 5 g (36.2 mmols) of $K_2CO_3$ during 24 hours.

After purification, 7 g of white powder are obtained, i.e. a yield of 61%.

Percentage in iodine
  Found : 48.8%
  Theory: 50%.
Purity: 97.8%.

EXAMPLE 6

Preparation of the Iodine-Containing Polymer of Formula 5 g (4.8 mmols) of the product obtained at example 4 step 4 are dissolved in 150 ml of N,N-dimethylacetamide. 4.7 ml (33.6 mmols) of triethylamine are added to the reaction medium.

25.6 g (33.6 mmols) of 2,4,6-triiodo-3-N-(2-acetoxyethyl)-5-acetoxyacetamido-isophthalic acid chloride are added dropwise under the form of powder to the reaction medium. The stirring is maintained during 24 hours at ambient temperature. The triethylamine salts are eliminated by filtration and the solution is poured onto 400 ml of ethylic ether.

The thus obtained precipitate is added to 300 ml of methanol and saponified with 10 g (0.072 mol) of $K_2CO_3$.

After purification, 13 g of white powder are obtained, i.e. a yield of 58%.

Percentage in iodine
  Found : 45.4%
  Theory: 46.7%.

Purity: 97.2%.

The macromolecular polyamine iodine-containing compounds according to the invention present particular features due to which they are interesting in X-ray imaging, especially an excellent stability and an especially high concentration in radio-opaque iodine-containing atoms.

The composition according to the invention based on the abovesaid contrast agents is consisting of an aqueous solution or of a suspension of at least one agent according to the invention, preferably in bidistilled water.

The diagnosis composition especially for X-rays, adapted to be used in human or animal, according to the invention is characterized by the fact that it comprises an efficient amount of at least one of the macromolecular polyamine

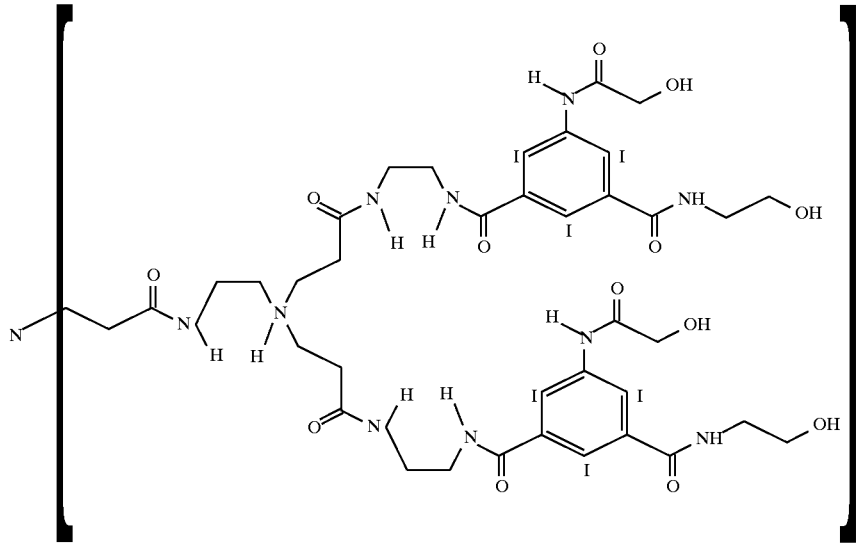

iodine-containing compounds according to the invention, the efficient amount being that which enables to inject an aqueous solution of the polymer comprising preferably from about 5 to about 50 g of iodine/100 ml of solution.

These compositions in question may contain the adjuvants generally used in the pharmaceutical compositions containing contrast agents, especially:
- sodium chloride,
- tris(hydroxymethyl)amino-methane hydrochlorate,
- amine of tris(hydroxymethyl)amino-methane,
- heparine,
- sodium citrate and
- sodium calciedetate.

In connection with its use in X-ray imaging in human, the abovesaid composition is administered at a useful dose from about 10 to about 250 ml of an aqueous solution containing from about 30 to about 500 g of iodine per kg.

Its administration, provided it is consisting of aqueous solutions, may be enterally or parenterally, especially orally, rectally, intravenously, intra-articularly, intra-arterially, sub-arachnoidly as well as bronchially, lymphatically and intra-uterinally.

In the case the composition according to the invention is an aqueous suspention, it can be administered enterally, orally, rectally or bronchially.

The pH of the said solutions is adjusted to a physiologically acceptable value generally comprised between about 6.5 and about 7.5.

In certain particular uses, it may be necessary, in connection with the diagnosis of a given pathology, especially at the level of a specific organ, to use what is called a "vectorisation" of the contrast agent which can be obtained either by encapsulation of the said agent within liposomes, or by its fixation or bounding on a biomolecule, especially poly- and monoclonal antibodies.

The pathologies whose diagnosis can be facilitated by way of such a vectorisation are espcially tumoral pathologies, liver pathologies and distribution abnormalities of the blood volume.

We claim:

1. A mono-dispersed dendrimer-type macromolecular polyamine iodine-containing compound of the formula:

$$P-[NK_x-A-G]_n \quad (I)$$

wherein
- P represents a macromolecular radical of said macromolecular polyamine compound,
- N represents a nitrogen atom of said polyamine compound,
- K is selected from the group consisting of a hydrogen atom, lower linear or branched alkyl group, lower linear or branched hydroxy- or polyhydroxy-alkyl group, lower linear or branched alkoxyalkyl group, lower linear or branched alkoxyhydroxy- or alkoxypolyhydroxyalkyl group, and group —A—G,
- x is an integer equal to 0 or 1,
- G is an iodine-containing radio-opaque benzenic derivative of the formula:

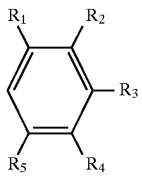

(II)

wherein the substituents $R_1$ and $R_5$, which are identical or different from one another, represent:
- iodine
- hydrogen,
- COOH,
- $COO^-M^{y+}$, M representing a physiological acceptable cation and y an integer from 1 to 3, —CON—R₇ or —NCOR₉ wherein R₆, R₇, R₈ and R₉,
  |                |
  R₆               R₈ which are identical or different from one another, are selected from the group consisting of a hydrogen atom, lower linear or branched alkyl group, lower linear or branched hydroxyalkyl group, lower linear or branched polyhydroxyalkyl group, lower linear or branched alkoxyalkyl group, lower linear or branched alkoxyhydroxy-alkyl group, lower linear or branched alkoxypolyhydroxyalkyl group, the substituents $R_2$, $R_3$ and $R_4$ being defined as $R_1$ and $R_5$ or a group

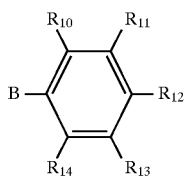

wherein
- the substituents $R_{10}$, $R_{11}$, $R_{12}$, $R_{13}$ and $R_{14}$, which are identical or different from one another, have the same signification as $R_1$ and $R_5$, and
- B represents a single bond or a group
- $-R_{15}-D-R_{16}-$ wherein $R_{15}$ and $R_{16}$, which are identical or different, represent the groups:

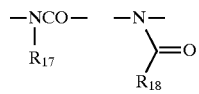

wherein
- $R_{17}$ and $R_{18}$ have the same signification as $R_6$ and
- D represents a single bond or has the same significations as $R_6$ except hydrogen,
- A is a bonding group that can join the amine group of the macromolecular polyamine radical with the iodine-containing radio-opaque benzenic derivative of formula (III), and
- n is an integer from 3 to 500, with the proviso that at least one of the substituents $R_1$, $R_2$, $R_3$, $R_4$, $R_5$, $R_{10}$, $R_{11}$, $R_{12}$, $R_{13}$ and $R_{14}$ represents an iodine atom.

2. A monodispersed dendrimer-type macromolecular polyamine iodine-containing compound according to claim 1, wherein n is an integer from 30 to 200.

3. A monodispersed dendrimer-type macromolecular polyamine iodine-containing compound according to claim 1, wherein the substituents $R_6$, $R_7$, $R_8$, $R_9$, $R_{17}$ and $R_{18}$ are selected from the group consisting of a hydrogen atom and

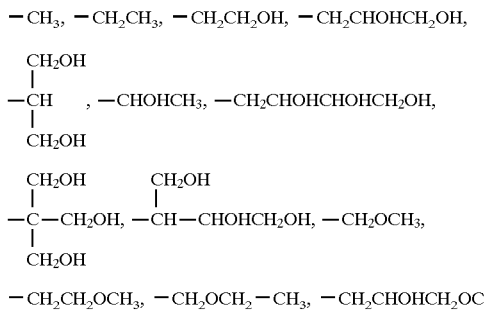

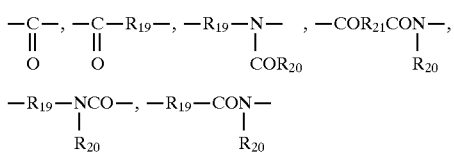

4. A monodispersed dendrimer-type macromolecular polyamine iodine-containing compound according to claim 1, wherein the bonding group A is selected from the group consisting of:

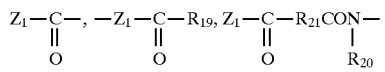

wherein
— $R_{19}$ is selected from the group consisting of a lower linear or branched alkyl group, lower linear or branched hydroxyalkyl group, lower linear or branched polyhydroxyalkyl group, lower linear or branched alkoxyalkyl group, lower linear or branched alkoxyhydroxyalkyl group, lower linear or branched alkoxypolyhydroxyalkyl group,
— $R_{20}$ has the same significations as $R_6$ and
— $R_{21}$ represents a single bond or has the same significations as $R_{19}$.

5. A monodispersed dendrimer-type macromolecular polyamine iodine-containing compound according to claim 1, wherein the radio-opaque iodine-containing benzenic derivative is selected from the group consisting of:

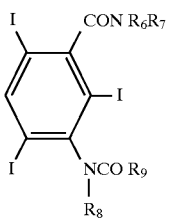 (IV)

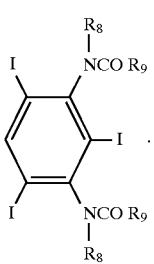 (V)

6. Process for the preparation of the a monodispersed dendrimer-type macromolecular polyamine iodine-containing compound according to claim 1, comprising the steps of:

— selecting the a monodispersed dendrimer-type macromolecular polyamine compound,
— subjecting at least three of the amine groups of the a monodispersed dendrimer-type macromolecular polyamine compound, either:
  — to an acylation reaction, in a solvent of the group comprising DMAC, DMF and DMSO, in the presence of a mineral or organic base selected from the group consisting of NaOH, triethylamine, and sodium carbonate, with a compound of the formula:

$$Z_1-A-G \qquad (VI)$$

wherein G is a defined in claim 1 and $Z_1$—A is selected from the group consisting of:

wherein $R_{19}$, $R_{20}$, $R_{21}$ are as defined in claim 1 and $Z_1$ represents a chlorine or bromine atom, the hydroxyl groups present being previously protected; or
  — to an alkylation reaction, a solvent selected from the group consisting of DMAC, DMF, and DMSO, in the presence of a mineral or organic base selected from the group consisting of NaOH, triethylamine, and sodium carbonate, with a compound of formula:

$$Z_2-A-G \qquad (VII)$$

wherein G is as defined in claim 1 and $Z_2$—A is selected from the group consisting of:

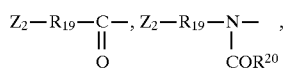

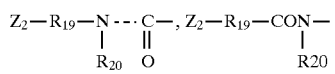

wherein $R_{19}$, $R_{20}$ are as defined in claim 1 and $Z_2$ is selected from the group consisting of chlorine, bromine, iodine, OMs (O-mesyl) group, OTs (O-tosyl) group, epoxyde, the hydroxyl groups present being previously protected;
— subjecting at least part of the residual amine groups of the macromolecular polyamine compound, after deprotection of the hydroxyl groups present, in a solvent selected from the group consisting of DMAC, DMF, and DMSO, in the presence of a mineral or organic base selected from the group consisting of NaOH, triethylamine, and sodium carbonate, to an alkylation reaction with a compound of the formula:

$$L-Y \qquad (VIII)$$

wherein Y has the same significations as $Z_2$ or represents an activated —CO group in the form of an acid halogenide, an anhydride or an ester, and L is selected from the group consisting of a lower linear or branched alkyl group, lower linear or branched hydroxy- or polyhydroxyalkyl group, lower linear or branched alkoxyalkyl group, lower linear or branched alkoxyhydroxy- or alkoxypoly-hydroxyalkyl group, the hydroxyl groups of which have been protected, and
— deprotecting the protected hydroxyl groups of L.

7. Diagnosis composition for X-rays to be used in a human or animal, comprising an effective amount of at least one a monodispersed dendrimer-type macromolecular polyamine iodine-containing compound according to claim 1, together with a pharmaceutically acceptable carrier.

8. A monodispersed dendrimer-type macro-molecular polyamine iodine-containing compound according to claim 1, wherein n is an integer from 10 to 300 and $R_2$, $R_3$ and $R_4$ have the same signification as $R_1$ and $R_5$.

9. A monodispersed dendrimer-type macromolecular polyamine iodine-containing compound according to claim 1, wherein the macromolecular polyamine compound is selected from the group consisting of polyalkylamines, polyethylenimines, polyamido-amines, branched polylysines and arborols.

10. Diagnosis composition for X-rays, to be used in a human or animal, comprising an effective amount of at least one a monodispersed dendrimer-type macromolecular polyamine iodine-containing compound according to claim 9, together with a pharmaceutically acceptable carrier.

* * * * *